(12) United States Patent
Teeple

(10) Patent No.: US 6,644,416 B2
(45) Date of Patent: Nov. 11, 2003

(54) TILLER

(76) Inventor: Robert A. Teeple, 6724 W. US Hwy. 6, Gibsonburg, OH (US) 43431

( * ) Notice: Subject to any disclaimer, the term of this patent is extended or adjusted under 35 U.S.C. 154(b) by 51 days.

(21) Appl. No.: 10/031,641

(22) PCT Filed: Mar. 27, 2001

(86) PCT No.: PCT/US01/09710
§ 371 (c)(1),
(2), (4) Date: Oct. 29, 2001

(87) PCT Pub. No.: WO01/72112
PCT Pub. Date: Oct. 4, 2001

(65) Prior Publication Data
US 2003/0098166 A1 May 29, 2003

Related U.S. Application Data
(60) Provisional application No. 60/192,857, filed on Mar. 29, 2000.

(51) Int. Cl.[7] .............................................. A01B 33/00
(52) U.S. Cl. ........................... 172/42; 172/354; 172/71
(58) Field of Search ............................... 172/42, 43, 45, 172/49, 54.5, 21, 22, 71, 351, 354, 356

(56) References Cited

U.S. PATENT DOCUMENTS

| 2,169,079 | A | * | 8/1939 | Bosworth et al. ............. 37/363 |
| 2,538,230 | A | * | 1/1951 | Boggs ....................... 56/12.7 |
| 2,634,770 | A | * | 4/1953 | Mall ........................... 30/379 |
| 2,903,077 | A | * | 9/1959 | Kamlukin .................... 172/42 |
| 3,074,491 | A | * | 1/1963 | Field ............................ 172/43 |
| 3,168,148 | A | * | 2/1965 | Marcoux ...................... 172/42 |
| 4,066,131 | A | | 1/1978 | Zandbergen |
| 4,286,670 | A | * | 9/1981 | Ackerman .................... 172/42 |
| 4,396,067 | A | | 8/1983 | Enters et al. |
| 4,591,001 | A | | 5/1986 | Barbee |
| 4,699,219 | A | * | 10/1987 | Durrant et al. ............... 172/42 |
| 5,197,551 | A | | 3/1993 | Farley |
| 5,562,166 | A | * | 10/1996 | Griffin ........................ 172/42 |
| 5,642,677 | A | | 7/1997 | Meyer |
| 5,713,420 | A | | 2/1998 | Roberts et al. |
| 5,896,931 | A | | 4/1999 | Roberts et al. |
| 6,056,065 | A | * | 5/2000 | Campbell et al. ............. 172/42 |
| 6,241,025 | B1 | * | 6/2001 | Myers et al. .................. 172/21 |

FOREIGN PATENT DOCUMENTS

| DE | 813326 | * | 9/1951 | ................... 172/42 |
| FR | 1290906 | * | 3/1962 | ................... 172/42 |
| GB | 901053 | * | 7/1962 | ................... 172/42 |

OTHER PUBLICATIONS

Tractors and Their Power Units, Liljedahl et al., 1979, John Wiley & Sons, Third Edition, pp. 304,305.*

* cited by examiner

*Primary Examiner*—Victor Batson
(74) *Attorney, Agent, or Firm*—MacMillan, Sobanski & Todd; Donald R. Fraser

(57) ABSTRACT

A tiller (10) having an engine (24), a plurality of rotating times (20), and a handle (26) which are rotatable with respect to a main frame (12) of the tiller (10) and cooperate with pivoting wheels (14) to facilitate turning of the tiller (10) while maintaining balance and stability.

21 Claims, 5 Drawing Sheets

TILLER

CROSS-REFERENCE TO RELATED APPLICATION

This application claims the benefit of U.S. provisional patent application Serial No. 60/192,857, filed Mar. 29, 2000.

FIELD OF THE INVENTION

The present invention relates to a tiller and more particularly to a tiller including an engine, a plurality of rotating tines, and a handle which rotate with respect to a main frame of the tiller.

BACKGROUND OF THE INVENTION

Tillers are typically used to cultivate soil in flower and vegetable gardens, lawns, and the like. The tiller prepares the ground for planting of seeds and seedling plants. Conventional tillers require considerable strength by the user to control and steer the tiller due to the size, weight, and lack of stability of the tiller.

Some tillers have tines or soil churning members disposed at the rear of the tiller behind a pair of wheels and an engine. Other tillers have tines disposed at the front of the tiller in front of the wheels and the engine. Tillers have been produced, such as disclosed in U.S. Pat. No. 5,896,931, where the handle of the tiller can be pivoted with respect to a main frame of the tiller. The pivoting of the handle converts the tiller from a rear tine type to a front tine type. With the pivoting handle tillers of the prior art, considerable strength is still required by the user to control and steer the tiller due to the size, weight, and lack of stability of the tiller.

It would be desirable to produce a tiller which maximizes the stability of the tiller, minimizes the strength required by the user to turn and control the tiller, and remains level with the ground during operation.

SUMMARY OF THE INVENTION

Consistent and consonant with the present invention, a tiller which maximizes the stability of the tiller, minimizes the strength required by the user to turn and control the tiller, and remains level with the ground during operation, has surprisingly been discovered. The tiller comprises: a main frame; a plurality of ground engaging wheels, the wheels being spaced apart to support the main frame for movement on the ground; a plurality of tilling tines mounted to rotate about a first axis and to rotate relative to the base about a second axis; a prime mover mounted to deliver power to the tines to effect rotation about the first axis; and a handle adapted for rotating the tines about the second axis.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DETAILED DESCRIPTION OF THE PREFERRED EMBODIMENT

Figure 1:
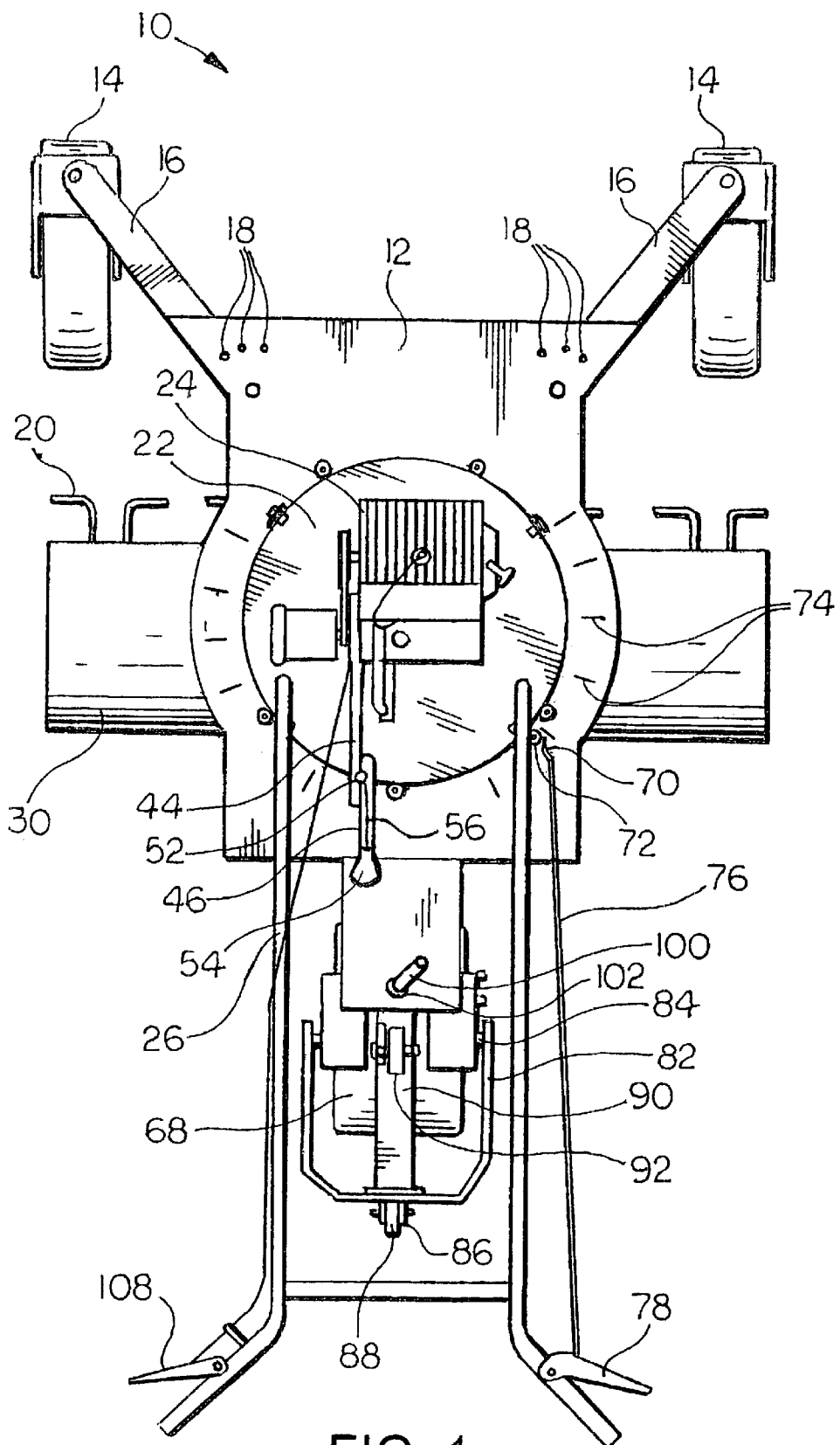
FIG. 1 is a top view of the tiller incorporating the features of the invention.
Figure 2:
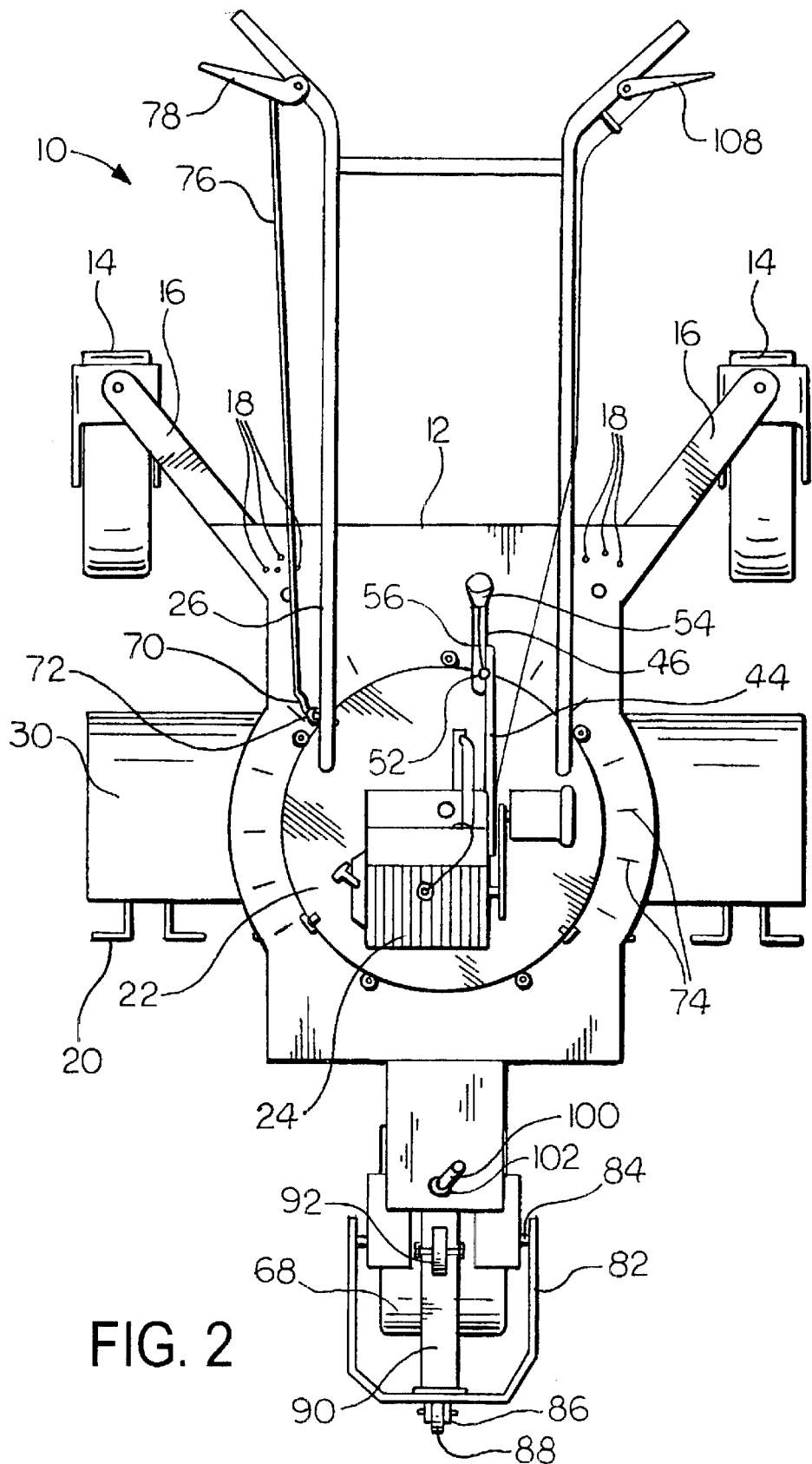
FIG. 2 is a top view of the tiller illustrated in FIG. 1 showing the handle, engine, and tines rotated 180 degrees from the position illustrated in FIG. 1.

Referring now to the drawings, and particularly FIG. 1, there is shown generally at 10 a tiller incorporating the features of the invention. The tiller 10 includes a main frame 12. Two ground engaging front wheels 14 are disposed on the front portion of the main frame 12. It is understood that other wheel configurations can be used. One end of a connecting arm 16 is disposed on the main frame 12 and the connecting arm 16 extends forwardly and laterally from the front portion of the main frame 12. The front wheels 14 are pivotally disposed on the distal end of the connecting arm 16 to permit the front wheels 14 to pivot through 360 degrees. A plurality of mounting holes 18 for the connecting arm 16 are disposed on the main frame 12 for selectively adjusting the wheel track or the distance between the front wheels 14.

Rotating tines 20, an engine base 22, a prime mover or engine 24, and a handle 26 are rotatingly mounted in the central portion of the main frame 12. The handle 26 extends upwardly and laterally from the base 22. The tines 20 are disposed on a tine shaft 28, illustrated in FIG. 3. The tine shaft 28 maintains the tines 20 fixed relative to each other. The tine shaft 28 and the tines 20 depend from the base 22. In alternative embodiments of the invention, the tines 20 are replaced with attachments for conducting lawn and garden maintenance such as, a plug or spike aerator, a power rake, a dethatcher, a snow blower, a trencher, a mowing deck, or a lawn edger, for example. A tine guard 30 is disposed to cover the tines 20. The tine guard 30 is pivotable with the tines 20, the base 22, the engine 24, and the handle 26 to militate against dirt being thrown into moving parts of the tiller 10 thereby causing undesirable wear.

Figure 4:
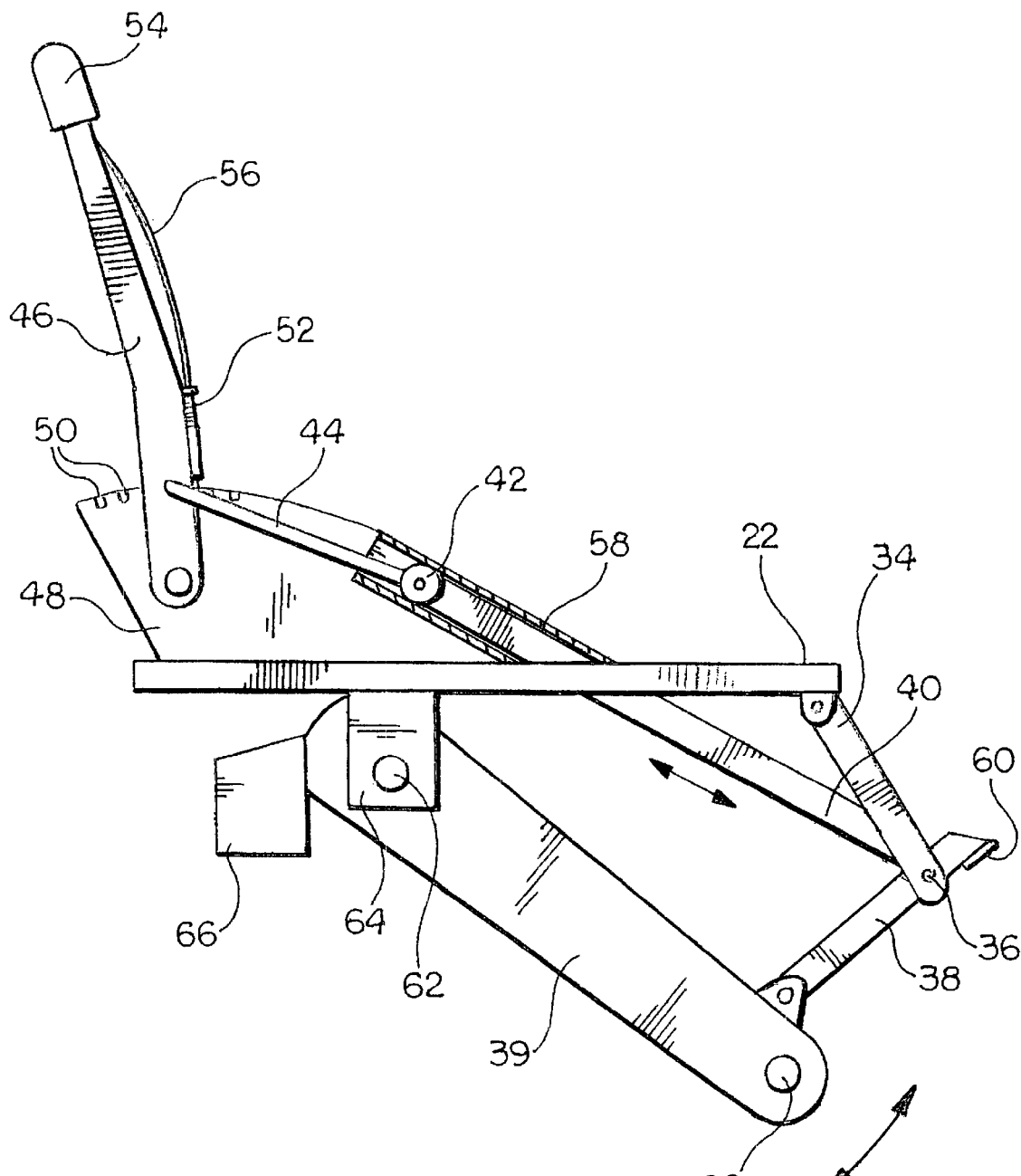
FIG. 4 is a partial elevation view showing the means for raising and lowering the tines of the tiller illustrated in FIGS. 1, 2, and 3 with the track shown in section.

In the embodiment shown, a linkage mechanism 32 for raising and lowering the tine shaft 28 and the tines 20 is disposed on the base 22, as illustrated in FIG. 4. One end of a first linkage arm 34 pivotally depends from the base 22. The other end of the first linkage arm 34 is connected at a pivot point 36 to one end of a second linkage arm 38. The other end of the second linkage arm 38 is pivotally connected to one end of a cover 39 which rotatingly supports the tine shaft 28. One end of a third linkage arm 40 is connected at the pivot point 36 to the first linkage arm 34 and the second linkage arm 38. The other end of the third linkage arm 40 has a roller 42 disposed thereon. A fourth linkage arm 44 has one end pivotally connected to the roller 42 and the other end pivotally connected to a lever 46. The lever 46 has one end pivotally disposed on a lever mounting bracket 48 which is fixedly disposed on the base 22.

A plurality of locking holes or notches 50 are formed in the mounting bracket 48. A spring loaded locking mechanism 52 is provided on the lever 46 to engage the locking holes 50 to selectively position the lever 46 at a variety of settings. The locking mechanism 52 is actuated by a knob or handle 54 connected to the locking mechanism 52 by a rigid cable or rod 56. The roller 42 is disposed in a track 58 to permit the second linkage arm 38 to axially move within the track 58. The track 58 is fixedly disposed on the base 22 and extends upwardly and angularly from the base 22.

The linkage mechanism 32 is shown in FIG. 4 with the tine shaft 28 in a partially raised position. When the tine shaft 28 is in the fully lowered position, a stop 60 prevents the linkage mechanism 32 from being further operated.

The cover 39 is pivotally connected to a drive shaft 62 at the end opposite from the tine shaft 28. The cover 39 conceals a drive chain (not shown) and a plurality of sprockets (not shown) which drivingly connect the tine shaft 28 and the drive shaft 62. The tine shaft 28 and drive shaft 62 are drivingly coupled to the engine 24 through a speed reduction device (not shown). Any conventional coupling means may be used such as, for example, a drive chain, a drive belt, and the like. The tines 20 can be driven forward or in reverse. The drive shaft 62 is rotatingly supported by a bracket 64 which depends from the base 22.

A counter weight 66 is disposed at the end of the cover 39 adjacent the drive shaft 62 to minimize the force required to raise the tine shaft 28. A spring (not shown) can be disposed between the base 22 and one or more of the first linkage arm 34, the second linkage arm 38, and the cover 39. The spring urges the one or more of the first linkage arm 34, the second linkage arm 38, and the cover 39 to minimize the force required to raise the tine shaft 28.

It is understood that other linkage mechanisms could be used such as, for example, cables or rods directly connected to the tine shaft 28 and other combinations of linkage arms.

A ground engaging rear wheel 68 is centrally disposed on the rear portion of the main frame 12, as illustrated in FIG. 1. In the embodiment shown, the rear wheel 68 rotates in a fixed direction. Alternatively, the rear wheel 68 is pivotally mounted and the front wheels 14 are rotated in a fixed direction. In another embodiment, dual rear wheels are provided. In yet another embodiment, the rear wheel 68 is driven by the engine 24 through a variable speed reducer permitting the rear wheel 6B to be driven both forward and in reverse.

A locking device 70 is provided to hold the base 22 in the desired position. The locking device 70 employs a spring-loaded pin 72 which cooperates with one of a plurality of protuberances 74 on the main frame 12 arranged circumferentially and radially outwardly of the base 22. The pin 72 is manipulated using a rigid rod 76 connected to a trigger 78. The spring urges the pin 72 into engagement with one of the protuberances 74 to militate against turning of the base 22 relative to the main frame 12. It is understood that other devices could be used to manipulate the pin 72 such as a cable in conduit linkage device, for example.

Figure 3:
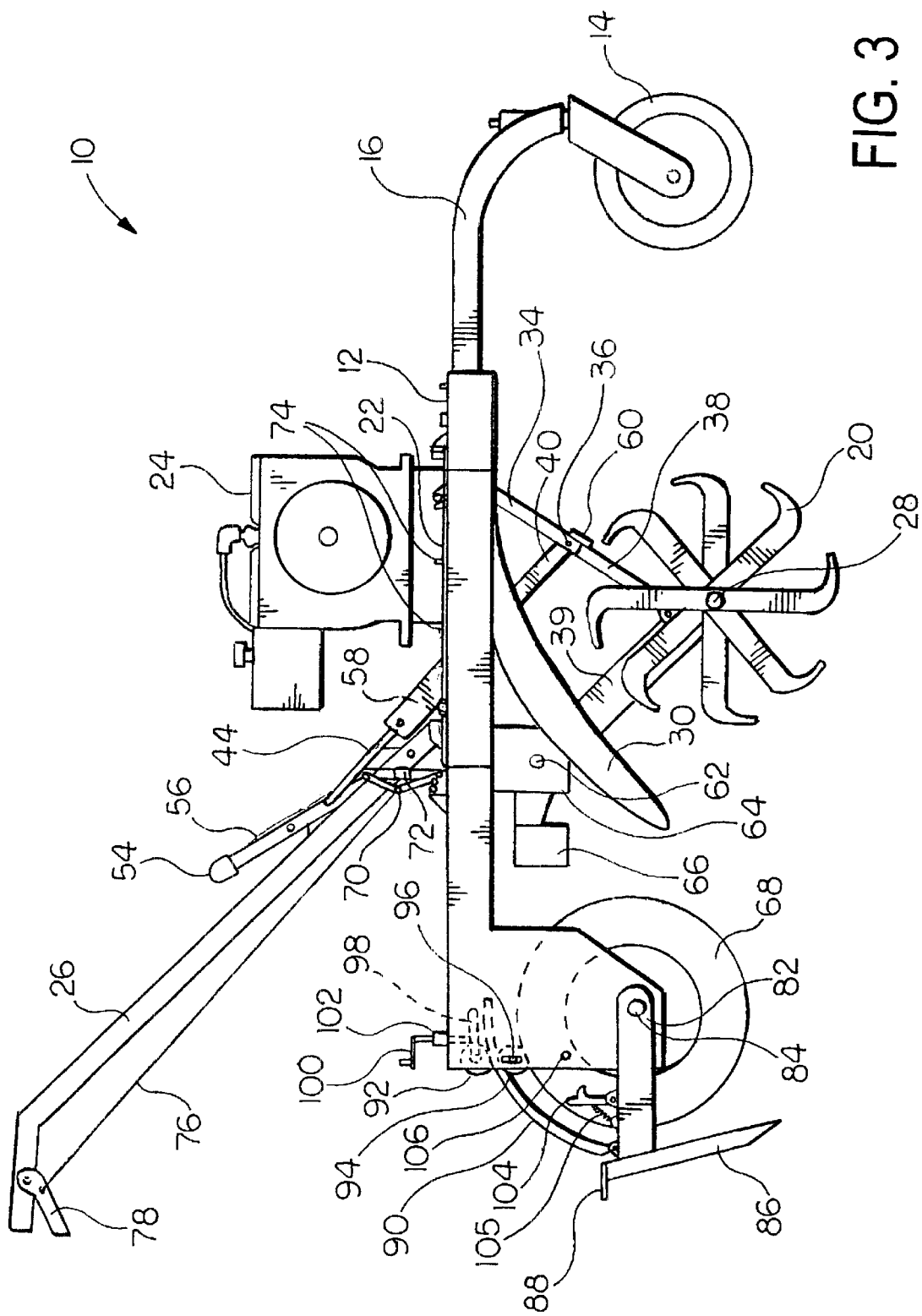
FIG. 3 is an elevation view of the tiller illustrated in FIGS. 1 and 2.
Figure 6:
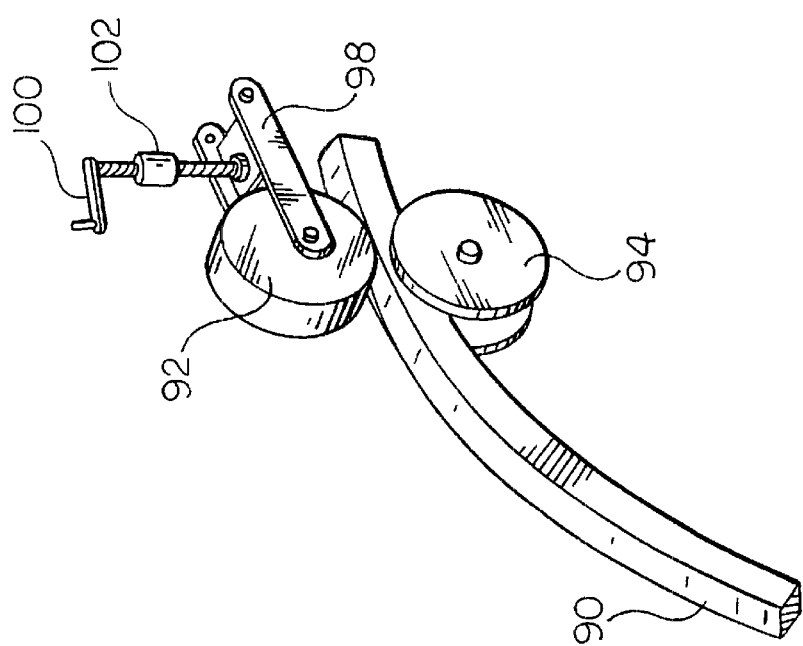
FIG. 6 is a partial perspective view showing the upper idler wheel, the lower idler wheel, the guide track and the tension adjuster of the drag assembly illustrated in FIG. 5.
Figure 5:
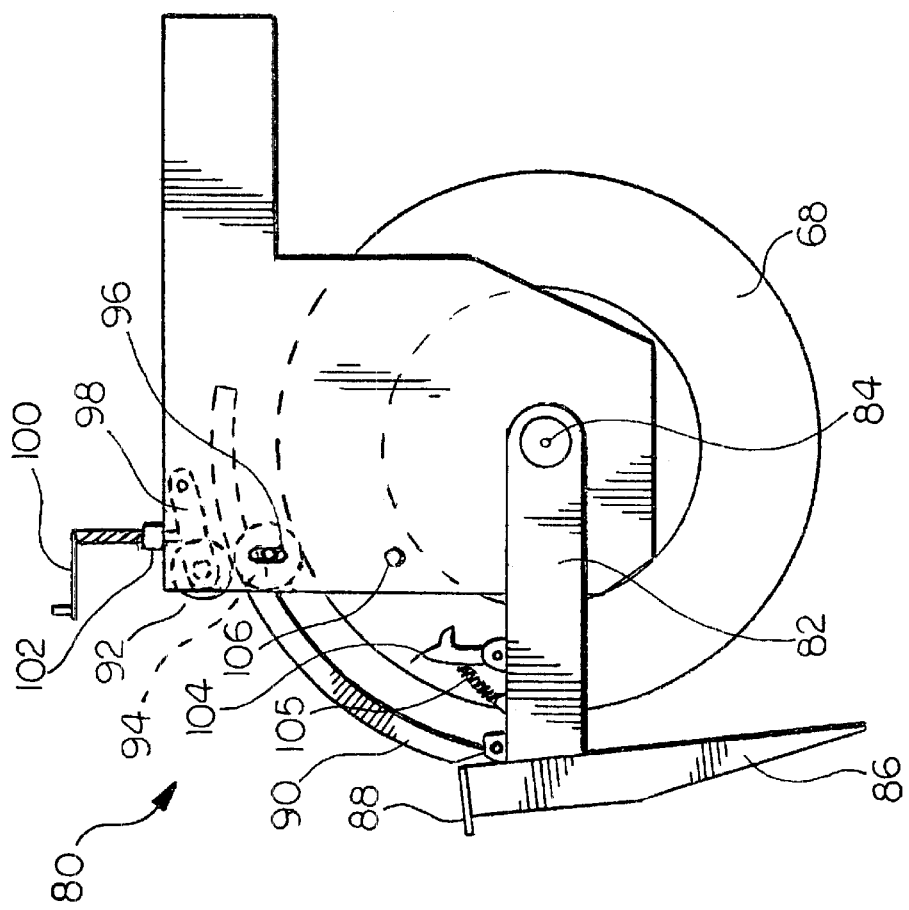
FIG. 5 is a partial elevation view showing the drag assembly of the tiller illustrated in FIGS. 1, 2, and 3.

A drag assembly 80 is disposed on the rear portion of the main frame 12, as illustrated in FIGS. 3, 5, and 6. The drag assembly 80 ensures efficient operation of the tiller 10 by restricting the forward movement of the tiller 10 and causing the tines 20 to work to the desired depth. The drag assembly 80 also breaks up the soil compacted by the rear wheel 68.

One end of a drag linkage 82 is pivotally disposed on an axle 84 of the rear wheel 68. A drag blade or depth stake 86 is disposed on the other end of the drag linkage 82. The drag blade 86 extends downwardly from the drag linkage 82 for engaging the ground. A foot pad 88 is disposed at the upper end of the drag blade 86 to be engaged by the operator's foot to cause the drag blade 86 to engage the ground in hard soil conditions, for example.

One end of a guide track 90 is pivotally disposed on the drag linkage 82 adjacent the drag blade 86. The guide track 90 is arcuate in shape and extends upwardly and forwardly from the drag linkage 82, generally following the peripheral surface of the rear wheel 68. The distal end of the guide track 90 is disposed between an upper idler wheel 92 and a lower idler wheel 94. The lower idler wheel is disposed in a slot 96 formed in the main frame 12. One end of an upper idler wheel bracket 98 rotatingly supports the upper idler wheel 92. The other end of the upper idler wheel bracket 98 is pivotally disposed in the main frame 12.

A threaded tension adjuster 100 is disposed in a threaded collar 102. The threaded collar 102 is disposed on the main frame 12. One end of the tension adjuster 100 abuts the upper idler wheel bracket 98. The tension adjuster 100 is rotated to selectively cause the tension adjuster 100 to urge the upper idler wheel bracket 98 and the upper idler wheel 92 downwardly against the guide track 90 or lessen the force exerted on the upper idler wheel bracket 98.

A locking mechanism 104 is disposed on a central portion of the drag linkage 82. The locking mechanism 104 includes a spring 105. The spring 105 urges the locking mechanism 104 to engage a locking stud 106 disposed on the main frame 12 when the drag assembly 80 is in the raised position. The locking mechanism 104 and the locking stud 106 cooperate to lock the drag assembly 80 in a disengaged position out of the soil when the tiller 10 is being transported or operated in reverse.

It is understood that a conventional drag assembly 80 could be used such as a manual assembly which is manually locked in the desired position, for example. Alternatively, a spring (not shown) could be used to urge the drag assembly 80 downwardly.

The tiller 10 controls are disposed on the handle 26. The controls include a drive lever 108 for engaging and disengaging the drive unit for the tines 20, throttle for the engine 24, and safety devices, for example.

A plurality of weight mounting devices (not shown) is disposed on the front and rear portions of the main frame 12 and the base 22. The weight mounting devices permit weight to be added to the tiller 10. The additional weight keeps the weight distribution constant relative to the tines 20 during use. The additional weight also ensures that the maximum digging depth of the tines 20 is reached.

In operation, the tines 20 cultivate the soil and propel the tiller 10 in the desired direction. When turning the tiller 10, at the end of a row for example, the pin 72 is removed from engagement with one of the protuberances 74. The pin 72 is retracted by depressing the trigger 78 causing the pin 72 to disengage with the one of the protuberances 74 currently engaged. When the pin 72 is in the disengaged position, the base 22 is permitted to freely rotate relative to the main frame 12. A lateral force is applied to the handle 26 to thereby cause the tines 20, the base 22, and the engine 24 to rotate with respect to the main frame 12. The front wheels 14 are caused to turn and the tines 20 propel the tiller 10 in the desired direction, thereby causing the tiller 10 to turn. Once the turn is complete, a lateral force is applied to the handle 26 to cause the tines 20, the base 22, and the engine 24 to rotate to the desired position to effect the desired motion. The trigger 78 is then released to re-engage the pin 72 with one of the protuberances 74.

Raising and lowering of the tine shaft 28 and the tines 20 are accomplished by manipulating the linkage mechanism 32. To raise the tine shaft 28 and the tines 20, the handle 54 is manipulated to disengage the locking mechanism 52 from one of the locking holes so and the handle 54 is moved forwardly which causes the fourth linkage arm 44 to axially move the third linkage arm 40 forwardly. The third linkage arm 40 thereby causes the first linkage arm 34 and the second linkage arm 38 to be pivoted with respect to the base 22 and the cover 39, respectively. The cover 39 thereby is caused to pivot upwardly with respect to the base 22, causing the tine shaft 28 and the tines 20 to be raised. To lower the tine shaft 28 and the tines 20, the handle 54 is moved rearwardly which causes the fourth linkage arm 44 to axially move the third linkage arm 40 rearwardly. The third linkage arm 40 thereby causes the first linkage arm 34 and the second linkage arm 38 to be pivoted with respect to the base 22 and the cover 39, respectively. The cover 39 is caused to pivot downwardly with respect to the base 22 thereby causing the tine shaft 28 and the tines 20 to be lowered. The tine shaft 28 and the tines 20 can be locked at a desired position by engaging the locking mechanism 52 with one of the locking holes 50.

The drag assembly 80 is operated by engagement of the rear wheel 68 and the lower idler wheel 94. The lower idler wheel 94 is caused to rotate by the rear wheel 68. When the tiller 10 is operating in the forward direction, the lower idler wheel 94 causes the guide track 90 to be driven downwardly to cause engagement of the drag blade 86 with the soil. The amount of engagement force between the lower idler wheel 94 and the rear wheel 68 is adjusted by selectively rotating the tension adjuster 100 which increases or decreases the force being applied to the upper idler wheel 92. As the upper idler wheel 92 is urged downwardly against the guide track 90, the guide track 90 is urged against the lower idler wheel 94. The lower idler wheel 94 is caused to slide downwardly in the slot 96 and the engagement force between the lower idler wheel 94 and the rear wheel 68 is increased. The increased engagement force causes the downward force on the guide track 90 and the drag blade 86 to increase. Conversely, as the upper idler wheel 92 is cause to move upwardly, the force on the guide track 90 is decreased. The lower idler wheel 94 is permitted to slide upwardly in the slot 96 and the engagement force between the lower idler wheel 94 and the rear wheel 68 is decreased. The decreased engagement force causes the downward force on the guide track 90 and the drag blade 86 to decrease.

When the tiller 10 is operated in the reverse direction, the reverse rotation of the rear wheel 68 causes the lower idler wheel 94 to drive the guide track 90 upwardly. Therefore, the drag blade 86 is caused to disengage with the soil. If the tiller 10 is driven a sufficient distance in reverse, the locking mechanism 104 will engage the locking stud 106 and lock the drag linkage 82 in the disengaged position. The tiller 10 can then be stored, or the locking mechanism 104 released and the tiller 10 returned to operation.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A tiller comprising:
   a main frame;
   a plurality of ground engaging wheels mounted on said main frame;
   a plurality of tilling tines carried by said main frame, said plurality of tines being rotatable about a first axis substantially parallel to the ground and selectively rotatable with respect to said main frame about a second axis substantially perpendicular to the ground;
   a prime mover for effecting rotation of said plurality of tines about the first axis; and
   a spring loaded locking device to militate against rotation of said plurality of tines about the second axis.

2. The tiller according to claim 1, including a base rotatingly mounted to said main frame.

3. The tiller according to claim 2, wherein said plurality of tines depend from said base.

4. The tiller according to claim 1, including means for raising and lowering said plurality of tines relative to the ground.

5. The tiller according to claim 1, including a drag blade secured to said main frame.

6. The tiller according to claim 5, including means for urging said drag blade downwardly.

7. The tiller according to claim 6, wherein said means for urging said drag blade is adjustable.

8. The tiller according to claim 6, wherein said means for urging said drag blade includes a guide track connected to said drag blade, the guide track being urged by at least one idler wheel in driving engagement with one of said ground engaging wheels.

9. The tiller according to claim 5 including means for raising said drag blade when the tiller is caused to move in a reverse direction.

10. The tiller according to claim 1, wherein said locking device is actuated by a trigger mechanism coupled to said locking device.

11. A tiller comprising:
    a main frame having a front portion and a rear portion;
    at least two ground engaging wheels supporting said frame with at least one of said wheels mounted on the front portion of said main frame and at least one of said wheels mounted on the rear portion of said main frame;
    a base rotatingly mounted on said main frame, said base having an upper portion and a lower portion, wherein said base is selectively rotatable relative to said main frame about an axis substantially perpendicular to the ground;
    a plurality of tilling tines depending from the lower portion of said base and rotatably supported by said base;

a prime mover connected to said plurality of tines to effect rotation of said plurality of tines; and a spring loaded locking device to militate against rotation of said base about the axis.

12. The tiller according to claim 11, including means for raising and lowering said plurality of tines relative to the ground.

13. The tiller according to claim 11, including a drag blade disposed on said main frame.

14. The tiller according to claim 13, including means for urging said drag blade downwardly.

15. The tiller according to claim 14, wherein said means for urging said drag blade is adjustable.

16. The tiller according to claim 14, wherein said means for urging said drag blade includes a guide track connected to said drag blade, the guide track urged by at least one idler wheel in driving engagement with one of said ground engaging wheels.

17. The tiller according to claim 13, including means for raising said drag blade when the tiller is caused to move in a reverse direction.

18. The tiller according to claim 11, wherein two of said wheels are disposed on the front portion of said main frame, a distance between said wheels being adjustable.

19. The tiller according to claim 11, wherein said locking device is actuated by a trigger mechanism coupled to said locking device.

20. An apparatus for conducting lawn and garden maintenance comprising:

a main frame having a front portion and a rear portion;

at least two ground engaging wheels supporting said frame with at least one of said wheels mounted on the front portion of said main frame and at least one of said wheels mounted on the rear portion of said main frame;

a base rotatingly mounted on said main frame, said base having an upper portion and a lower portion, wherein said base is selectively rotatable relative to said main frame about an axis substantially perpendicular to the ground;

an attachment for conducting lawn and garden maintenance depending from the lower portion of said base and rotatably supported by said base;

a prime mover connected to said attachment to effect operation of said attachment; and a spring loaded locking device to militate against rotation of said base about the axis.

21. A tiller comprising:

a main frame;

a plurality of ground engaging wheels mounted on said main frame;

a plurality of tilling tines carried by said main frame; and a prime mover for effecting rotation of said plurality of tines about a first axis substantially parallel to a plane parallel to the ground;

means for effecting rotation of said plurality of tines about a second axis substantially perpendicular to the plane parallel to the ground;

a drag blade secured to said main frame; and means for urging said drag blade downwardly, wherein said means for urging said drag blade includes a guide track connected to said drag blade, the guide track being urged by at least one idler wheel in driving engagement with one of said ground engaging wheels.

* * * * *